United States Patent [19]
Murakami et al.

[11] Patent Number: 4,914,365
[45] Date of Patent: Apr. 3, 1990

[54] CONTROL DEVICE FOR SERVO MOTOR
[75] Inventors: Shin Murakami, Hachioji; Ryoichi Kurosawa, Kokubunji, both of Japan
[73] Assignee: Kabushiki Kaisha Toshiba, Kawasaki, Japan
[21] Appl. No.: 253,482
[22] Filed: Oct. 5, 1988
[30] Foreign Application Priority Data
 Oct. 9, 1987 [JP] Japan ................................. 62-255303
[51] Int. Cl.$^4$ .............................................. G05B 11/36
[52] U.S. Cl. .................................... 318/609; 318/610; 318/632; 318/561; 318/636
[58] Field of Search ............... 318/609, 610, 632, 561, 318/636, 571
[56] References Cited
U.S. PATENT DOCUMENTS
 4,733,149 3/1988 Culberson .......................... 318/561
 4,742,285 5/1988 Sasaki et al. ........................ 318/632
 4,810,945 3/1989 Yoneda et al. ...................... 318/571

Primary Examiner—William M. Shoop, Jr.
Assistant Examiner—Saul M. Bergmann
Attorney, Agent, or Firm—Foley & Lardner, Schwartz, Jeffery, Schwaab, Mack, Blumenthal & Evans

[57] ABSTRACT

A control device for a servo motor comprises feedforward means for correcting a speed reference obtained by a position control device by a correction amount obtained on the basis of an objective position or an objective speed of the servo motor so that a response delay of the position control device for obtaining a reference speed necessary to control the rotation angle position of the servo motor to an objective rotation angle position is compensated for while restricting vibration.

7 Claims, 5 Drawing Sheets

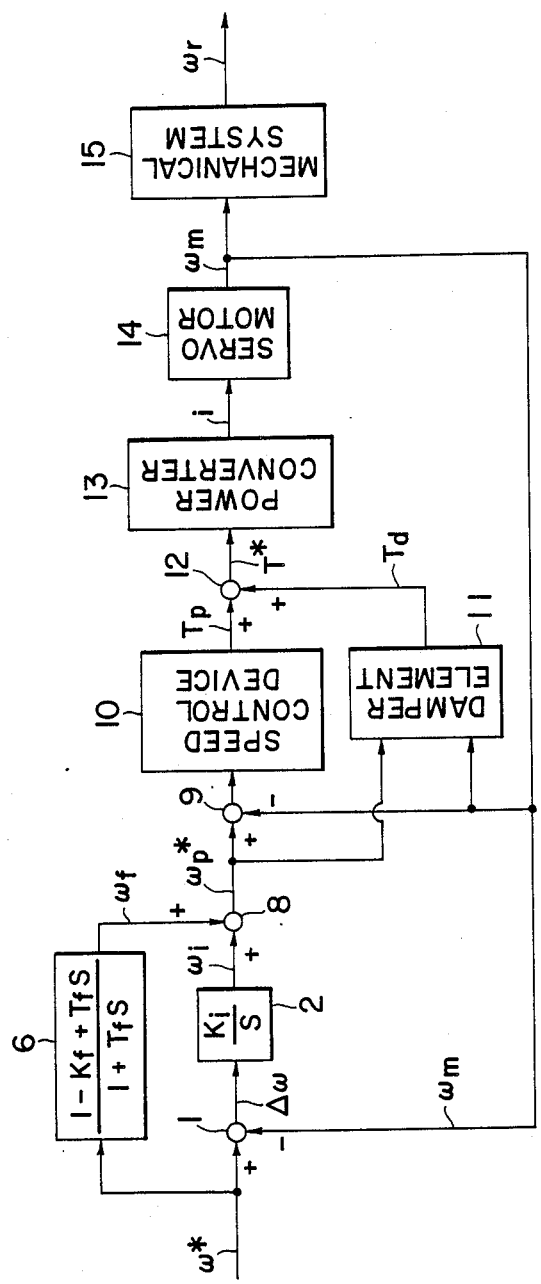
F I G. 1

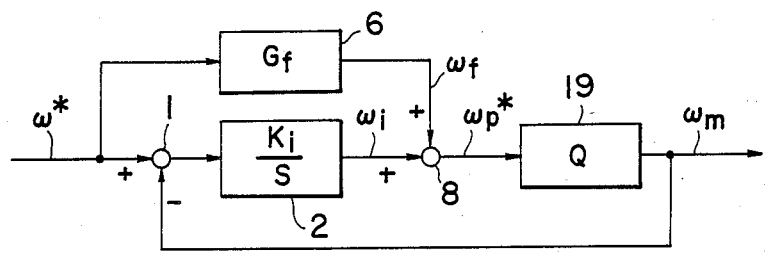
F I G. 2
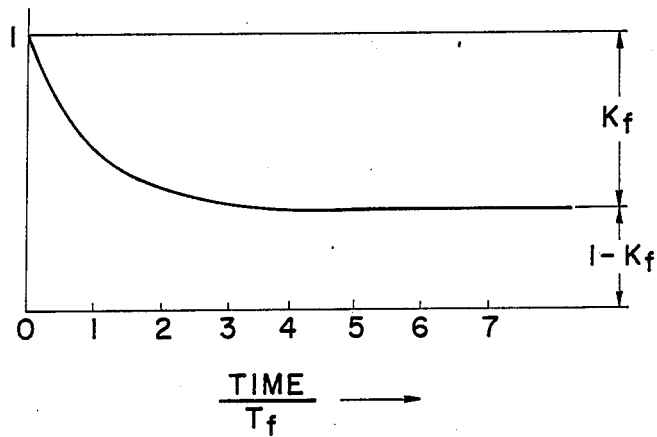
F I G. 3
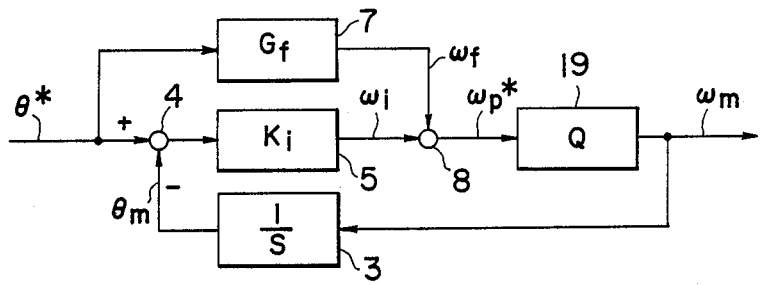
F I G. 6

CONTROL DEVICE FOR SERVO MOTOR

BACKGROUND OF THE INVENTION

1. Field of the invention

The present invention relates to a control device for servo motors used to drive industrial robots, etc.

2. Description of the Prior Art

In order to move a top portion of an industrial robot, such as an arm thereof, along a predetermined passage at a desired speed by a servo motor, it has been usual to control the servo motor on the basis of objective values of a position or angle to which the arm is to be settled, and a moving speed of the arm, which is obtained by calculations. In a conventional control device for driving such an industrial robot, a positional deviation $\Delta P$ is obtained by integrating a difference $\Delta\omega = \omega^* - \omega_m$ between a measured value $\omega_m$ of rotational speed of the servo motor for driving a mechanical system composed of the arm, etc., and an objective rotational speed $\omega^*$ thereof, and a reference value $\omega p^*$ of the rotational speed of the servo motor at which the positional deviation $\Delta P$ becomes zero, is obtained in a position control device by multiplying a signal indicative of the positional deviation $\Delta P$ with a predetermined gain $K_i$. Then, a reference torque value $T^*$ of the servo motor at which a difference between the reference speed value $\omega p^*$ and the measured speed value $\omega_m$ of the servo motor becomes zero, is obtained by a speed control device. An armature current i of the servo motor is regulated by a power converter on the basis of the reference torque $T^*$ to drive the mechanical system of the robot. Gains of respective control elements are regulated such that dynamic characteristics of the mechanical system become optimum.

In the case of a robot having multiple articulates, the moment of inertia of the arm around the root portion thereof is largely due to the cantilever type of support structure, and the natural frequency of vibration becomes smaller, to facilitate vibration of the mechanical system comprising the arm, etc. In order to restrict such vibration, it has been usual to make the gain $K_i$ of the position control device smaller to thereby reduce the control response or to make time dependency of variation of the objective input $\omega^*$ smaller.

In the former solution, not only does the operation time of the mechanical system becomes longer, but also the positional deviation during operation increases, resulting in the accuracy of continuous interpolation for moving passage being lowered.

SUMMARY OF THE INVENTION

An object of the present invention is to provide a control device for a servo motor by which vibration of a mechanical system to be driven by the servo motor is restricted while making the delay of the control response smaller.

The above object can be achieved according to the present invention by the provision of a servo motor control device including position control means for obtaining a speed reference for controlling the angular position of the servo motor to an objective angular position, speed control means for obtaining a reference torque at which a speed deviation between a measured rotational speed of the servo motor and a reference speed obtained by the position control means becomes zero and a power converter for controlling an armature current of the servo motor on the basis of a reference torque obtained by the speed control means, characterized by comprising feedforward means for obtaining the correction amount necessary to compensate a response delay of the position control means and means for correcting the reference speed obtained by the position control means with a correction amount obtained by the feedforward means.

BRIEF DESCRIPTION OF THE DRAWING

FIG. 1 is a block circuit diagram showing a first embodiment of a control device for a servo motor, according to the present invention;

FIG. 2 is an explanatory block diagram for an operation of a feedforward element of the control device shown in FIG. 1;

FIG. 3 is a graph showing a step response of the feedforward element of the control device shown in FIG. 1;

FIG. 6 is an explanatory block diagram for an operation of a feedforward element of the device shown in FIG. 5.

DETAILED DESCRIPTION OF THE PREFERRED EMBODIMENTS

Figure 4:
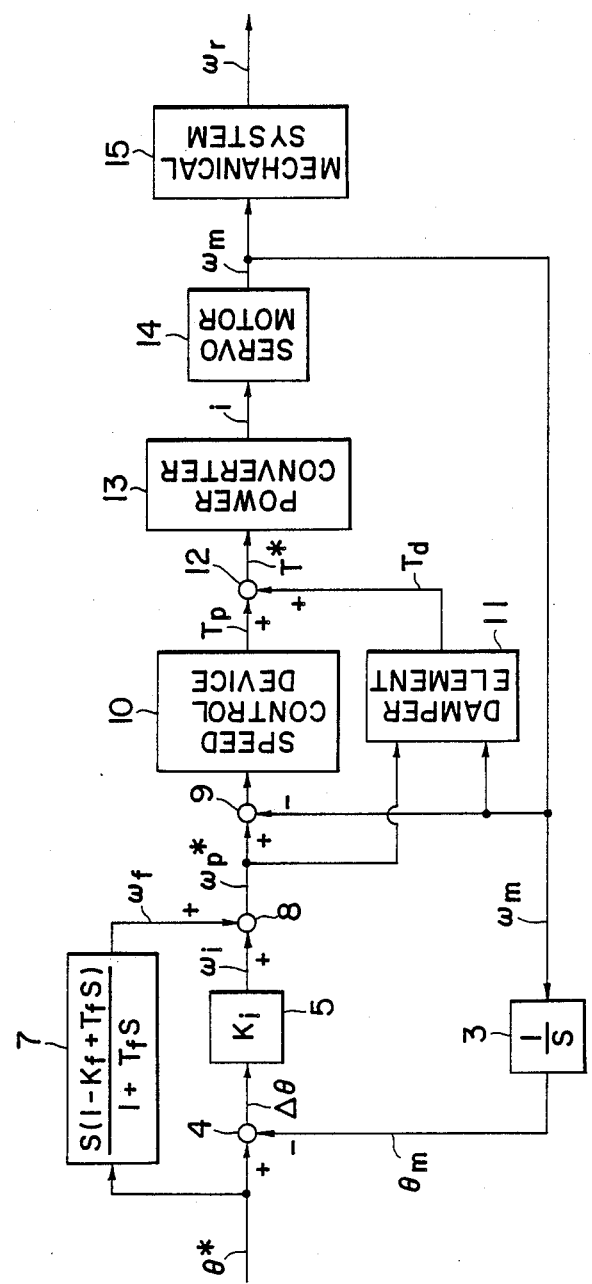
FIG. 4 is a block circuit diagram of a second embodiment of the present control device.

A first embodiment of the present control device is shown in FIG. 1. The control device according to this embodiment includes an adder 1, a position control device 2, a feedforward element 6, adders 8 and 9, a speed control device 10, a damper element 11 and a power converter 13. The adder 1 calculates a deviation $\Delta\omega$ between an objective rotational speed value $\omega^*$ and a measured speed value $\omega_m$ of a servo motor 14 for driving a mechanical system 15 including an arm of a robot, etc. In the position control device 2, the deviation $\Delta\omega$ obtained by the adder 1 is integrated to obtain a position deviation which is multiplied with a suitable gain $K_i$ to obtain a rotational speed reference value $\omega_i$ of the servo motor 14 at which the position deviation becomes zero.

In order to compensate for response delay of the position control device 2, a correction amount $\omega_f$ for the reference value $\omega_i$ of rotational speed of the servo motor 14 is obtained, at the same time, by the feedforward element 6 on the basis of the objective rotational speed value $\omega^*$. The transfer function $G_f(S)$ of the feedforward element 6 is represented by the following equation (1).

$$G_f(S) = (1 - K_f + T_f S)/(1 + T_f S) \tag{1}$$

where S is a Laplace complex variable, $K_f$ is a coefficient satisfying $0 \leq K_f \leq 1$ and $T_f$ is a positive coefficient.

A summation of the reference value $\omega_i$ of rotational speed obtained by the position control device 2 and the correction amount $\omega_f$ from the feedforward element 6 is performed in the adder 8, the result being used as a corrected reference rotational speed value $\omega_p^*$. A deviation between the corrected reference value $\omega_p^*$ and the measured rotational speed value $\omega_m$ of the servo motor 14 is obtained by the adder 9. On the basis of the deviation, a torque instruction $T_p$ for the servo motor 14 at which the deviation becomes zero is obtained by the speed control device 10.

On the other hand, the speed and acceleration of the robot arm of the mechanical system 15 are estimated by the damper element 11 on the basis of the corrected reference rotational speed value $\omega_p{}^*$ and the measured rotational speed $\omega_m$ of the servo motor 14 and, then, on the basis of the estimations, a torque instruction $T_d$ for improving the damping characteristics of the robot arm is obtained by the damper element 11. A summation of the torque instruction $T_d$ and an output Tp of the speed control device 10 is performed by the adder 12, the output of which becomes a reference torque T* of the servo motor 14. On the basis of T*, an armature current i of the servo motor 14 is controlled by the power converter 13, so that the speed $\omega_r$ of the robot arm of the mechanical system 15 is regulated to a desired value.

In such control device as above, the compensation for response delay of control of the position control device 2 is performed as shown in FIG. 2. In FIG. 2, a reference numeral 19 shows a control loop from the adder 9 in FIG. 1 to the servo motor 14, which has a transfer function Q. A symbol $G_f$ shows a transfer function of the feedforward element 6. A transfer function $\Omega_p{}^*/\Omega^*$ from the aimed rotation speed $\omega^*$ to a corrected reference rotation speed value $\omega_p{}^*$ can be represented as follows:

$$\Omega_p{}^*/\Omega^* = (G_f + K_i/S)/(1 + K_i \cdot Q/S) \quad (2)$$

where it is assumed that Q can be approximated to the following primary delay factor.

$$Q = 1/(1 + T_q \cdot S) \quad (3)$$

By inserting the equations (1) and (3) into the equation (2), the following is obtained:

$$\Omega_p/\Omega^* = (K_i + (1 - K_f + K_i \cdot T_f)S + T_f S^2)(1 + T_q \cdot S)/[(K_i + S + T_q S^2)(1 + T_f S)] \quad (4)$$

Assuming $T_f = T_q$ and $K_f = K_i \cdot T_f$, the equation (4) can be written as:

$$\Omega_p{}^*/\Omega^* = 1 \quad (5)$$

Therefore, by suitably selecting the feedforward element 6, the control response delay of the position control device 2 can be compensated for.

A step response of the feedforward element 6 selected as above is shown in FIG. 3. From this step response, it is clear that a compensation of transient deviation of the primary delay system having an arbitrary time constant and adjustment of the normal feedforward amount are possible by suitably changing the coefficients $T_f$ and $K_f$ of the transfer function $G_f$ of the feedforward element 6 (cf. the equation (1)). For example, when $K_f = 1$, only the transient deviation of the primary delay system can be compensated for.

According to this embodiment in which the response delay of the position control element 2 can be compensated for by means of the feedforward element 6, it is possible to reduce the positional deviation and increase the control response speed. Further, with the feedforward element capable of not only compensating transient deviation of the primary delay system having an arbitrary time constant but also of arbitrarily setting the normal feedforward amount, it is possible to prevent overshoot due to excessive feedforward. In addition, it is possible to restrict undesired vibration by estimating the speed and acceleration of the robot arm to be driven by the servo motor and feedback-controlling it on the basis of the estimations.

Although, in the first embodiment, the feedback control is performed by the damper element, the damper element can be replaced by any other means. Or, when the damping characteristics of the mechanical system itself are acceptable, such a damper element can be omitted.

FIG. 4 shows a second embodiment of the present invention. A control device according to the second embodiment includes an integrator 3, an adder 4, a position control device 5, a feedforward element 7, adders 8 and 9, a speed control device 10, a damper element 11, an adder 12 and a power converter 13. Since all components of the second embodiment except the integrator 3, the adder 4, the position control device 5 and the feedforward element 7 are the same as those shown in FIG. 1, details thereof are omitted to avoid duplication. The measured rotational speed value $\omega_m$ of the servo motor 14 is integrated in the integrator 3 to obtain a rotation angle $\theta_m$ of the servo motor 14, which is subtracted from the objective rotation angle $\theta^*$ thereof in the adder 4 to obtain a positional deviation $\Delta\theta$ therebetween. The positional deviation $\Delta\theta$ thus obtained is multiplied with the gain $K_i$ by the position control device 5 and a reference rotational speed value $\omega_i$ of the servo motor 14 at which the deviation $\Delta\theta$ becomes zero is obtained.

On the other hand, in order to compensate for the response delay of the position control device 5 on the basis of the objective rotation angle value $\theta^*$, a correction value $\omega_f$ for the speed of the servo motor 14 with respect to the reference value $\omega_i$ is obtained by the feedforward element 7. The transfer function $G_f(S)$ of the feedforward element 7 in this case becomes as follows:

$$G_f(S) = [S(1 - K_f + T_f S)]/(1 + T_f S) \quad (6)$$

where $K_f$ is a coefficient satisfying $0 \leq K_f \leq 1$ and $T_f$ is a positive coefficient.

A sum of the reference value $\omega_i$ from the position control device 5 and the correction value $\omega_f$ from the feedforward element 7 is obtained in the adder 8 as a corrected reference rotational speed value $\omega_p{}^*$. Then, as in the first embodiment, the servo motor 14 is controlled through the speed control device 10, the damper element 11 and the power converter 13, on the basis of the corrected reference value $\omega_p{}^*$ and the measured speed value $\omega_m$. The response delay of the position control device 5 is also compensated for by the feedforward element 7 as in the same manner as described with reference to the first embodiment.

According to the second embodiment, it is possible to reduce the positional deviation and speedup the control response due to the fact that the response delay of the position control device 5 is compensated by the feedforward element 7. Further, since the feedforward element 7 compensates for a transient deviation of the primary delay system having an arbitrary time constant and makes the normal feedforward amount possible to set arbitrarily, it is possible to prevent overshoot due to an excess amount of feedforward from occurring. In addition, since the feedback control is performed by using estimated speed and acceleration of the robot arm, it is possible to prevent vibration from occurring.

Figure 5:
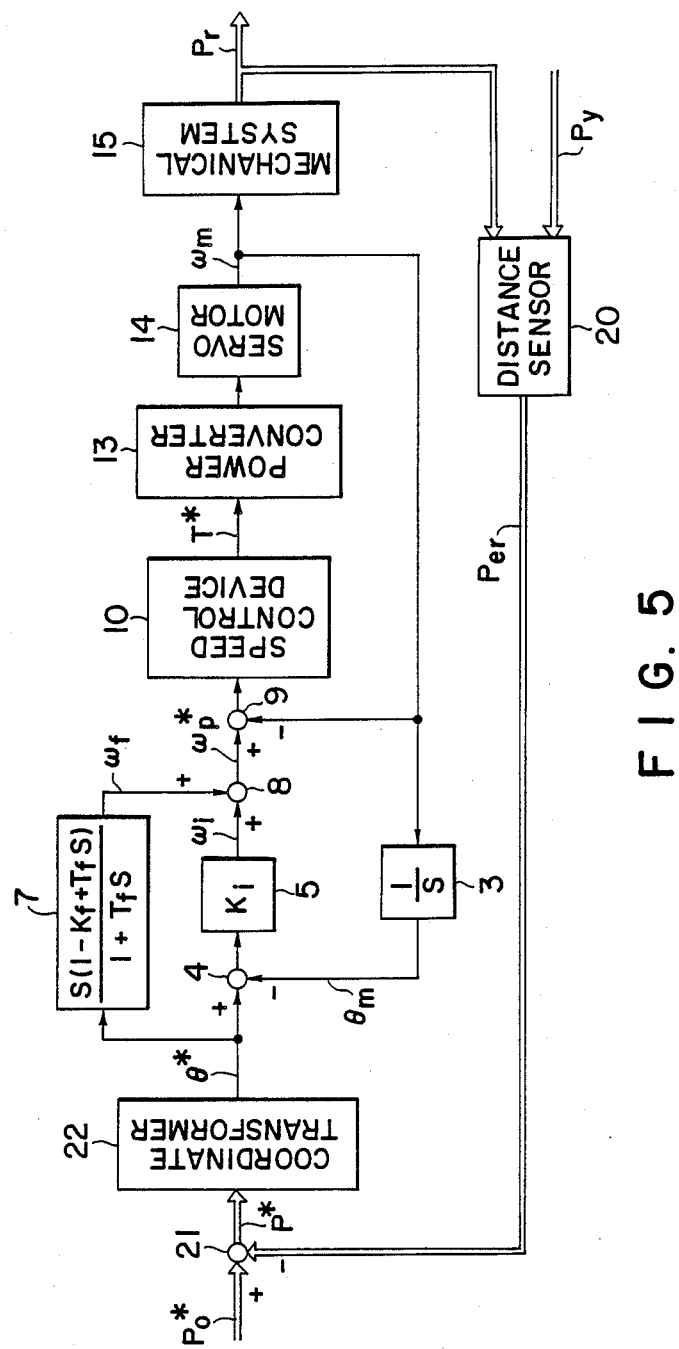
FIG. 5 is a block circuit diagram of a third embodiment of the present control device.

FIG. 5 shows a third embodiment of the control device for a servo motor. The embodiment includes outside the position control loop, a correction loop for correcting a position with respect to the objective position, which has means including an adder 21 and a coordinate transformer 22, for totally controlling an operation of a whole robot, and means including an adder 4, a position control device 5, a feedforward element 7, an adder 8, a speed control device 5 and a power converter 13, for controlling servo motors 14 of respective articulates of the robot, although FIG. 5 shows a construction for one articulate.

A difference $P_{er}$ between a position $P_r$ of a tool of the robot and a desired work point $P_j$ with respect to a work is detected by a distance sensor 20 mounted on a top end of the robot and a deviation between the difference $P_{er}$ and an aimed position $P_o^*$ obtained from a predetermined instruction data is obtained by an adder 21 as a corrected objective position $P^*$. The corrected objective position $P^*$ is transformed into an objective rotation angle of an i-th servo motor of the servo motors 14 of the respective drive shafts of the robot and $\theta^*$ is obtained as an objective rotation angle of the servo motor 14 of an i-th drive shaft.

The measured rotational speed $\omega_m$ of the servo motor 14 is integrated by the integrator 3 to obtain the measured rotation angle $\theta_m$ which is processed by the adder 4 to obtain a deviation $(\theta^* - \theta_m)$ of it with respect to the objective value $\theta^*$. A resulting positional deviation is multiplied with a suitable gain $K_i$ by the position control device 5 so that a reference rotational speed $\omega_i$ of the servo motor 14 at which the above positional deviation becomes zero is obtained.

On the basis of the objective rotation angle $\theta^*$, a correction amount $\omega_f$ for the reference rotational speed $\omega_i$ of the servo motor 14 is obtained by the feedforward element 7 upon which the compensation of the response delay of the position control device 5 is realized. The transfer function $G_f(S)$ of the feedforward element 7 for this case is represented by the aforementioned equation (6).

A sum of the reference rotational speed $\omega_i$ from the position control device 5 and the correction amount $\omega_f$ for the reference value $\omega_i$, which is provided by the feedforward element 7 is obtained by the adder 8 as a corrected reference rotational speed $\omega_p^*$. A difference $(\omega_p^* - \omega_m)$ between the corrected reference value $\omega_p^*$ and the measured rotational speed $\omega_m$ of the servo motor 14 is obtained by the adder 9 and a torque instruction $T^*$ of the servo motor 14 at which the difference becomes zero is obtained by the speed control device 10. On the basis of this torque instruction $T^*$, an armature current of the servo motor 14 is controlled by the power converter 13 to drive the mechanical system 15 of the robot.

FIG. 6 shows how to compensate for the response delay of the position control device 5 in the construction shown in FIG. 5. In FIG. 6, a reference numeral 19 depicts the whole control elements effective in obtaining the rotational speed of the servo motor 14 from the output of the adder 8 in FIG. 5 and the control object, which has a transfer function Q. The transfer function of the feedforward element 7 is also depicted by $G_f$. The transfer function $\Omega^*/\Theta^*$ from the reference rotation angle $\theta^*$ to the corrected reference rotational speed $\omega_p^*$ can be represented as follows:

$$\Omega^*/\Theta^* = (K_i + G_f)/(1 + K_i \cdot Q/S) \tag{7}$$

where it is assumed that Q can be approximated by the primary delay element such as shown by the equation (3).

By using the equations (1) and (3) in the equation (7), it can be rewritten as follow:

$$\Omega^*/\Theta^* = [K_i + (1 - K_f + K_i \cdot T_f)S + T_f S^2](1 + T_q \cdot S) \cdot S/[(K_i + S + T_q \cdot S^2)(1 + T_f S)] \tag{8}$$

Assuming $T_f = T_q$ and $K_f = K_i \cdot T_f$, the equation (8) can be rewritten as follows:

$$\Omega^*/\Theta^* = S \tag{9}$$

Therefore, it is possible to compensate the response delay of the position control device 5 by suitably selecting the feedforward element 7.

According to this embodiment by which the response delay of the control device 5 can be compensated for by the feedforward element 7 and in which the feedforward element allows a arbitrary setting of the normal feedforward amount, it is possible to reduce the positional deviation of the robot etc. to thereby shorten the control response for contour turning, to compensate for transient deviation of the primary delay system having an arbitrary time constant and to prevent overshoot due to excess feedforward.

Figure 7:
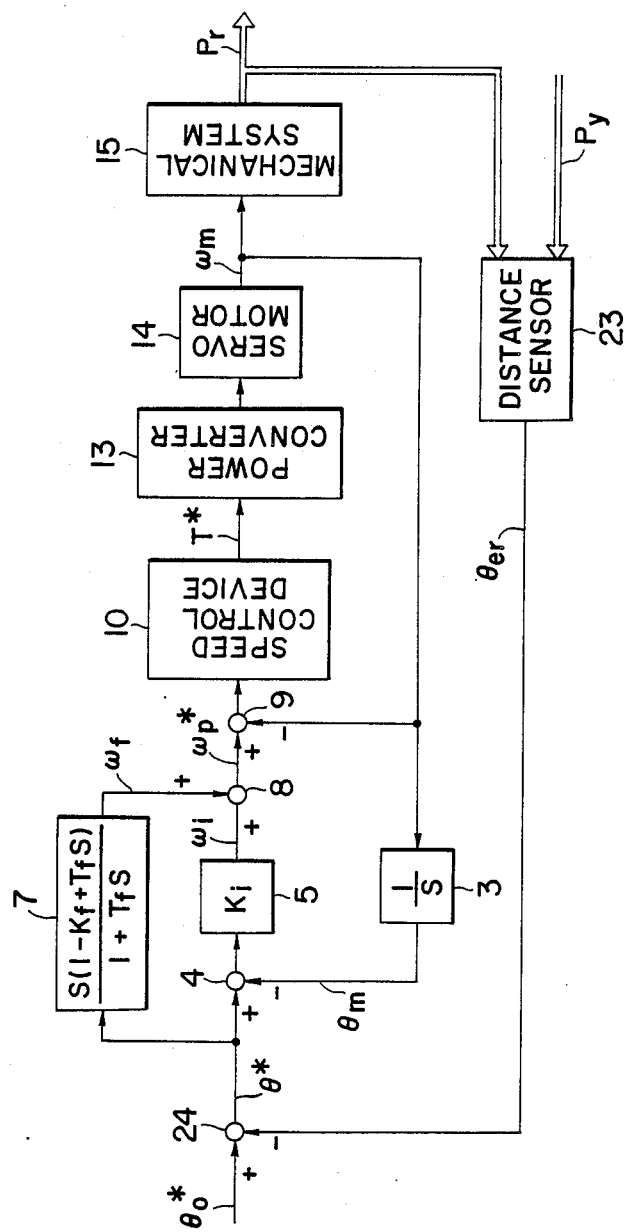
FIG. 7 is a block circuit diagram of a fourth embodiment of the present control device.

FIG. 7 shows a fourth embodiment of the present invention. A control device according to this embodiment corresponds substantially to the third embodiment shown in FIG. 5 having no coordinate transformer and is used in cases where a moving direction of a machine to be driven by a servo motor coincides with a detecting direction of a distance sensor.

A distance sensor 23 mounted on a top end of a robot detects a distance between a position $P_r$ of a tool of the robot and a desired work point $P_j$ as a deviation which is converted into an angle deviation $\theta_{er}$ corresponding to a rotation angle of the servo motor 14. A difference between the angle deviation $\theta_{er}$ and an aimed rotation angle $\theta_o^*$ of the servo motor obtained by an instruction is obtained by an adder 24 to obtain a corrected aimed rotation angle $\theta^*$. Constructive components other than the distance sensor 23 and the adder 24 function similarly to the third embodiment shown in FIG. 5 and perform a contour turning control.

Also, in this embodiment by which the response delay of the control device 5 can be compensated for by the feedforward element 7 and in which an output of the distance sensor 23 is input to the servo system without coordinate transformation, it is possible to reduce positional deviation to thereby quicker control response for contour turning, to simplify the construction of the control device and to reduce time delays due to the coordinate transformation.

What is claimed is:

1. A control device for a servo motor comprising:
   position control means for obtaining a reference speed necessary to control a rotational angle position of said servo motor to an objective rotational angle position, said position control means including an integrating component to obtain said reference speed on the basis of a speed deviation between an actual speed and an objective speed of said servo motor;
   feedforward means for obtaining a correction amount necessary to compensate for the response delay of said position control means, said feedforward means functioning to obtain said correction amount on the basis of said objective speed and having a transfer function $G_f(S)$ represented by the following equation $$G_f(S) = (1 - K_f + T_f S)/(1 + T_f S)$$

wherein S is a Laplace complex variable, $K_f$ is a coefficient satisfying $0 \leq K_f \leq 1$ and $T_f$ is a positive coefficient;

correction means for correcting said reference speed obtained by said position control means by said correction amount obtained by said feedforward means;

speed control means for obtaining a reference torque necessary to reduce to zero a deviation between said actual speed of said servo motor and said corrected reference speed obtained by said correction means; and a power converter for controlling an armature current of said servo motor on the basis of said reference torque obtained by said speed control means.

2. The control device as claimed in claim 1, further comprising damper means for obtaining a torque instruction necessary to improve the damping characteristics of a mechanical system as a load of said servo motor on the basis of said corrected reference speed and said actual speed of said servo motor, and for correcting said reference torque by said torque instruction.

3. A control device for a servo motor comprising:

integration means for obtaining a rotation angle of said servo motor on the basis of an actual speed of said servo motor;

position control means for obtaining a reference speed necessary to control a rotational angle position of said servo motor to an objective rotational angle position, said position control means including an integration means for obtaining said reference speed at which an angle deviation between said objective rotation angle and said rotation angle obtained by said integration means reduces to zero;

feedforward means for obtaining a correction amount necessary to compensate for the response delay of said position control means, said feedforward means functioning to obtain said correction amount on the basis of said objective rotation angle and having the following transfer function $G_f(S)$ $$G_f(S) = S(1 - K_f + T_f S)/(1 + T_f S)$$

wherein S is a Laplace complex variable, $K_f$ is a coefficient satisfying $0 \leq K_f \leq 1$ and $T_f$ is a positive coefficient;

correction means for correcting said reference speed obtained by said position control means by said correction amount obtained by said feedforward means;

speed control means for obtaining a reference torque necessary to reduce to zero a deviation between the actual speed of said servo motor and said corrected reference speed obtained by said correction means; and a power converter for controlling an armature current of said servo motor on the basis of said reference torque obtained by said speed control means.

4. The control device as claimed in claim 3, further comprising damper means for obtaining a torque instruction necessary to improve the damping characteristics of a mechanical system as a load of said servo motor on the basis of said corrected reference speed and said actual speed of said servo motor, and for correcting said reference torque by said torque instruction.

5. The control device as claimed in claim 3, further comprising;

position deviation detection means for detecting a position deviation between a position of a mechanical system as a load of said servo motor and a desired position thereof; and objective position correction means for correcting said objective rotational angle position of said servo motor on the basis of said position deviation detected by said position deviation detection means.

6. The control device as claimed in claim 5, wherein said objective position correction means includes:

means for correcting said position of said mechanical system by said position deviation detected by said position deviation detection means; and coordinate conversion means for converting said corrected position into an objective rotation angle.

7. The control device as claimed in claim 3, further comprising:

position deviation detection means for detecting a rotation angle deviation on the basis of a positional deviation between a position of a mechanical system as a load of said servo motor and a desired position thereof; and objective position correction means for correcting said position of said mechanical system by said rotation angle deviation detected by said position deviation detection means.

* * * * *